(12) United States Patent
Kito et al.

(10) Patent No.: US 8,124,666 B2
(45) Date of Patent: Feb. 28, 2012

(54) ENERGY RAY-CURABLE INK COMPOSITION

(75) Inventors: Katsuyuki Kito, Ibaraki (JP); Masayuki Oya, Ibaraki (JP); Satoshi Kobayashi, Ibaraki (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 0 days.

(21) Appl. No.: 12/365,710

(22) Filed: Feb. 4, 2009

(65) Prior Publication Data
US 2009/0197988 A1 Aug. 6, 2009

(30) Foreign Application Priority Data

Feb. 5, 2008 (JP) .................................. 2008-025674

(51) Int. Cl.
*C08F 2/50* (2006.01)
*C08F 290/14* (2006.01)

(52) U.S. Cl. ................................ 522/16; 522/26; 522/84

(58) Field of Classification Search ................. 522/16, 522/84, 26
See application file for complete search history.

(56) References Cited

U.S. PATENT DOCUMENTS

| 5,254,429 A * | 10/1993 | Gracia et al. ................. 430/162 |
| 5,275,646 A | 1/1994 | Marshall et al. |
| 7,309,550 B2 * | 12/2007 | Rach et al. ....................... 430/18 |
| 7,581,829 B2 | 9/2009 | Oyanagi et al. |
| 2006/0014851 A1 | 1/2006 | Loccufier et al. |
| 2006/0187285 A1 | 8/2006 | Oyanagi et al. |
| 2007/0129457 A1 | 6/2007 | Nakano et al. |
| 2007/0249750 A1 * | 10/2007 | Oyanagi et al. ................. 522/84 |
| 2008/0076846 A1 | 3/2008 | Kito et al. |
| 2008/0286484 A1 | 11/2008 | Tojo et al. |

FOREIGN PATENT DOCUMENTS

| EP | 0 540 203 A1 | 5/1993 |
| EP | 1 671 805 A2 | 6/2006 |
| JP | 5-214279 A | 8/1993 |
| JP | 2006-131883 A | 5/2006 |
| JP | 2006-131884 A | 5/2006 |
| JP | 2006-137183 A | 6/2006 |
| JP | 2007-100054 A | 4/2007 |
| JP | 2007-138084 A | 6/2007 |
| JP | 2007-182536 A | 7/2007 |
| JP | 2008-201876 A | 9/2008 |
| WO | WO-99/29787 A2 | 6/1999 |
| WO | WO-2007/018426 A1 | 2/2007 |

OTHER PUBLICATIONS

Search Report mailed May 11, 2009 for European Application No. 09151900.9.
Office Action issued on Mar. 31, 2009 in corresponding Japanese Application No. 2008-025674.

* cited by examiner

*Primary Examiner* — Mark Eashoo
*Assistant Examiner* — Jessica Paul
(74) *Attorney, Agent, or Firm* — Birch, Stewart, Kolasch & Birch, LLP

(57) ABSTRACT

An object of the present invention is to provide an energy ray-curable ink composition which is excellent in curability and adhesion, and is also excellent in storage stability.
The present invention relates to an energy ray-curable ink composition comprising a coloring material; a polyfunctional monomer having three or more ethylenical double bonds in one molecule as a polymerizable compound; an α-aminoalkylphenone-based compound and a thioxanthone-based compound as photopolymerization initiators; and a hindered amine-based compound having a 2,2,6,6-tetramethylpiperidinyl group as an antigelling agent.

4 Claims, No Drawings

ENERGY RAY-CURABLE INK COMPOSITION

BACKGROUND OF THE INVENTION

1. Field of the Invention

The present patent application claims priority under the Paris Convention based on Japanese Patent Application No. 2008-25674 (filed on Feb. 5, 2008), and the entire content of the aforementioned application is herein incorporated by reference.

The present invention relates to an energy ray-curable ink composition, particularly to an energy ray-curable ink composition to be used for an ink-jet recording system.

2. Description of the Related Art

As an ink composition to be applied for an ink-jet recording system, for example, an aqueous ink containing water as a main component and an oil-based ink containing an organic solvent as a main component have conventionally been used. However, intense interest has been shown towards a solvent-free type energy ray-curable ink composition in which an ink is cured by irradiating with energy ray (for example, ultraviolet rays) so as to suppress blur of the printed material (see, for example, Japanese Unexamined Patent Publication (Kokai) No. 5-214279).

As means for curing the energy ray-curable ink composition described above, for example, a low-pressure mercury lamp, a high-pressure mercury lamp, an ultrahigh-pressure mercury lamp, a xenon lamp and a metal halide lamp have been used. However, the energy ray-curable ink composition has a problem such as poor adhesion since a polymerizable compound usually has low reactivity and sufficient curability is not obtained due to oxygen inhibition when energy ray having high energy is not irradiated. Therefore, excess irradiation is performed so as to improve curability and an energy ray curing treatment is used in combination with a heat treatment so as to improve adhesion to a recording medium. However, when the irradiation means described above is used, the size of the entire mage recording device increases and also power consumption increases. Since heat is likely to be generated when irradiated with ultraviolet rays using a mercury lamp or a metal halide lamp, there arises a problem that, when a thin film is used as the recording medium, curl and waviness of the thin film are caused by excess irradiation with energy ray and a heat treatment. Therefore, it is required to develop an ink composition which has high curing sensitivity to energy ray and good adhesion to the recording medium.

Thus, the present inventors have previously proposed an ink composition containing, as a polymerizable compound, a polyfunctional monomer having excellent curing sensitivity, and an ink composition containing the polyfunctional monomer and also containing, as a photopolymerization initiator, an α-aminoalkylphenone-based compound capable of easily generating a radical so as to provide an ink composition which is excellent in curability and adhesion even when irradiated with energy ray having low energy (see Japanese Unexamined Patent Publication (Kokai) No. 2006-131883 and Japanese Unexamined Patent Publication (Kokai) No. 2006-131884).

However, the ink composition capable of curing with energy ray having low energy easily causes initiation of polymerization with heat or light during storage since a monomer having excellent curing sensitivity and a photopolymerization initiator must be used, leading to deterioration of storage stability. Although the addition of an antigelling agent is proposed so as to improve storage stability, the addition causes a problem such as inhibition of the polymerization reaction when irradiated with energy ray.

SUMMARY OF THE INVENTION

The present invention has been made so as to achieve the above object and an object thereof is to provide an energy ray-curable ink composition which is excellent in curability and adhesion even when irradiated with energy ray having low energy, and is also excellent in storage stability.

The present invention provides the following means for achieving the above-described objects.

[1] An energy ray-curable ink composition comprising a coloring material; a polyfunctional monomer having three or more ethylenical double bonds in one molecule as a polymerizable compound; an α-aminoalkylphenone-based compound and a thioxanthone-based compound as photopolymerization initiators; and a hindered amine-based compound having a 2,2,6,6-tetramethylpiperidinyl group as an antigelling agent.

[2] The energy ray-curable ink composition according to the above-item [1], wherein the hindered amine-based compound has a 1-hydroxy-2,2,6,6-tetramethyipiperidinyl group.

[3] The energy ray-curable ink composition according to the above-item [1], which contains, as the hindered amine-based compound, bis(1-oxyl-2,2,6,6-tetramethylpiperidin-4-yl)sebacate.

[4] The energy ray-curable ink composition according to any one of the above-items [1] to [3], which contains the polyfunctional monomer in an amount of 10 to 65% by mass, the α-aminoalkylphenone-based compound in an amount of 2 to 20% by mass, the thioxanthone-based compound in an amount of 0.1 to 10% by mass and the hindered amine-based compound in an amount of 0.01 to 3% by mass, based on the entire amount of the ink composition.

[5] The energy ray-curable ink composition according to any one of the above-items [1] to [4], which contains the α-aminoalkylphenone-based compound in an amount of 40 to 99% by mass and the thioxanthone-based compound in an amount of 1 to 60% by mass, based on the entire amount of the photopolymerization initiator.

[6] An energy ray-curable ink composition comprising a coloring material; at least one of a polyfunctional monomer selected from the group consisting of trimethylolpropane tri(meth)acrylate and pentaerythritol tri(meth)acrylate as a polymerizable compound; at least one of an α-aminoalkylphenone-based compound selected from the group consisting of 2-methyl-1-[4-(methylthio)phenyl]-2-morpholinopropan-1-one and 2-benzyl-2-dimethylamino-1-(4-morpholinophenyl)-butanone, and a thioxanthone-based compound as photopolymerization initiators; and bis(1-oxyl-2,2,6,6-tetramethylpiperidin-4-yl)sebacate as an antigelling agent;
wherein
the energy ray-curable ink composition contains the polyfunctional monomer in an amount of 10 to 65% by mass, the α-aminoalkylphenone-based compound in an amount of 2 to 20% by mass, the thioxanthone-based compound in an amount of 0.1 to 10% by mass and the bis(1-oxyl-2,2,6,6-tetramethylpiperidin-4-yl)sebacate in an amount of 0.01 to 3% by mass, based on the entire amount of the ink composition; and
also contains the α-aminoalkylphenone-based compound in an amount of 40 to 99% by mass and the thioxanthone-based compound in an amount of 1 to 60% by mass, based on the entire amount of the photopolymerization initiator.

Since the ink composition contains a polyfunctional monomer having three or more ethylenical double bonds in one molecule as a polymerizable compound and also contains an α-aminoalkylphenone-based compound and a thioxanthone-based compound as photopolymerization initiators, an ink composition having excellent curing sensitivity can be obtained even when irradiated with energy ray having low energy. The ink composition contains a polymerizable compound having excellent curing sensitivity and a photopolymerization initiator and therefore easily causes initiation of polymerization with heat or light during storage. However, since the ink composition contains a hindered amine-based compound having a 2,2,6,6-tetramethylpiperidinyl group as an antigelling agent, storage stability can be improved. The antigelling agent is less likely to cause polymerization inhibition upon irradiation with energy ray. Therefore, it is possible to obtain an ink composition which is excellent in curability and adhesion, and is also excellent in storage stability.

As described above, according to the present invention, it is possible to provide an ink composition which is excellent in curability and adhesion even when irradiated with energy ray having low energy, and is also excellent in storage stability.

DESCRIPTION OF THE PREFERRED EMBODIMENTS

The energy ray-curable ink composition of the present embodiment contains, as a polymerizable compound, a polyfunctional monomer having three or more ethylenical double bonds in one molecule so as to ensure high curing sensitivity even when irradiated with energy ray having low energy. Specific examples of a polyfunctional monomer having three ethylenical double bonds in one molecule include trimethylolpropane tri(meth)acrylate, pentaerythritol tri(meth)acrylate, tris(2-hydroxyethyl)isocyanurate tri(meth)acrylate, glyceryl tri(meth)acrylate, and ethylene oxide-modified, propylene oxide-modified and caprolactone-modified ones thereof. Specific examples of a polyfunctional monomer having four ethylenical double bonds in one molecule include ditrimethylolpropane tetra(meth)acrylate, pentaerythritol tetra(meth)acrylate, and ethylene oxide-modified, propylene oxide-modified and caprolactone-modified ones thereof. Specific examples of a polyfunctional monomer having five ethylenical double bonds in one molecule include dipentaerythritol hydroxypenta(meth)acrylate, and ethylene oxide-modified, propylene oxide-modified and caprolactone-modified ones thereof. Specific examples of a polyfunctional monomer having six ethylenical double bonds in one molecule include dipentaerythritol hexa(meth)acrylate, and ethylene oxide-modified, propylene oxide-modified and caprolactone-modified ones thereof. These polyfunctional monomers having three or more ethylenical double bonds in one molecule may be used alone or in combination. Among these monomers, low viscosity compounds such as trimethylolpropane tri(meth)acrylate, pentaerythritol tri(meth)acrylate, pentaerythritol tetra(meth)acrylate, and ethylene oxide-modified, propylene oxide-modified and caprolactone-modified ones thereof are particularly preferable.

An amount of the polyfunctional monomer having three or more ethylenical double bonds in one molecule in the ink composition is not particularly limited, and is preferably within a range from 10 to 65% by mass based on the entire composition. When the amount is within the above range, an ink composition having high curing sensitivity is obtained.

The energy ray-curable ink composition may further contain, as a polymerizable compound, a polymerizable monomer having one or two ethylenical double bonds in one molecule. It is possible to obtain an ink composition, which has low viscosity suited for an ink-jet recording system and also has a proper surface tension, by containing such a polymerizable monomer.

Specific examples of the polymerizable monomer having one ethylenical double bond in one molecule include amyl (meth)acrylate, isoamyl(meth)acrylate, octyl(meth)acrylate, isooctyl(meth)acrylate, decyl(meth)acrylate, isodecyl(meth) acrylate, lauryl(meth)acrylate, isomyristyl(meth)acrylate, stearyl(meth)acrylate, isostearyl(meth)acrylate, 2-ethylhexyl-diglycol(meth)acrylate, 2-(meth)acryloyloxyethyl-hexahydrophthalic acid, neopentyl glycol benzoate(meth) acrylate, butoxyethyl(meth)acrylate, ethoxy-diethylene glycol(meth)acrylate, methoxy-triethylene glycol(meth) acrylate, methoxy-polyethylene glycol(meth)acrylate, methoxydipropylene glycol(meth)acrylate, phenoxyethyl(meth) acrylate, phenoxy-polyethylene glycol(meth)acrylate, nonylphenolethylene oxide adduct (meth)acrylate, tetrahydrofurfuryl(meth)acrylate, isobonyl(meth)acrylate, 2-hydroxyethyl(meth)acrylate, 2-hydroxypropyl(meth)acrylate, 2-hydroxybutyl(meth)acrylate, 2-hydroxy-3-phenoxypropyl (meth)acrylate, 2-(meth)acryloyloxyethyl-succinic acid, 2-(meth)acryloyloxyethyl-phthalic acid, 2-(meth)acryloyloxyethyl-2-hydroxyethyl-phthalic acid, and acrylate monomers obtained by adding a functional group such as phosphorus or fluorine group thereto.

Specific examples of the polymerizable monomer having two ethylenical double bonds in one molecule include hydroxypivalic acid neopentyl glycol di(meth)acrylate, polytetramethylene glycol di(meth)acrylate, trimethylolpropanebenzoate (meth)acrylate, diethylene glycol di(meth) acrylate, triethylene glycol di(meth)acrylate, tetraethylene glycol di(meth)acrylate, polyethylene glycol (200) di(meth) acrylate, polyethylene glycol (400) di(meth)acrylate, polyethylene glycol (600) di(meth)acrylate, polyethylene glycol (1000) di(meth)acrylate, dipropylene glycol di(meth)acrylate, tripropylene glycol di(meth)acrylate, polypropylene glycol (400) di(meth)acrylate, polypropylene glycol (700) di(meth)acrylate, neopentyl glycol di(meth)acrylate, 1,3-butanediol di(meth)acrylate, 1,4-butanediol di(meth)acrylate, 1,6-hexanediol di(meth)acrylate, 1,9-nonanediol di(meth) acrylate, neopentyl glycol di(meth)acrylate, dimethylol-tricyclodecane di(meth)acrylate, bisphenol A ethylene oxide adduct di(meth)acrylate and bisphenol A propylene oxide adduct di(meth)acrylate.

An amount of the polymerizable monomer having one or two ethylenical double bonds in one molecule in the ink composition is not particularly limited, and is preferably within a range from 10 to 70% by mass based on the entire composition.

The energy ray-curable ink composition may further contain, as a polymerizable compound, an oligomer or a prepolymer. Specific examples of the oligomer or prepolymer include Ebecryl230, Ebecryl244, Ebecryl245, Ebecryl270, Ebecryl280/15IB, Ebecryl284, Ebecryl285, Ebecryl4830, Ebecryl4835, Ebecryl4858, Ebecryl4883, Ebecryl8402, Ebecryl8803, Ebecryl8800, Ebecryl254, Ebecryl264, Ebecryl265, Ebecryl294/35HD, Ebecryl1259, Ebecryl1264, Ebecryl4866, Ebecryl9260, Ebecryl8210, Ebecryl1290, Ebecryl1290K, Ebecryl5129, Ebecryl2000, Ebecryl2001, Ebecryl2002, Ebecryl2100, KRM7222, KRM7735, KRM4842, KRM210, KRM215, KRM4827, KRM4849, KRM6700, KRM6700-20T, KRM204, KRM205, KRM6602, KRM220, KRM4450, KRM770, IRR567, IPR81, IPR84, IPR83, IPR80, IPR657, IPR800, IPR805, IPR808, IPR810, IPR812, IPR1657, IPR1810, IRR302, IPR450, IPR670, IPR830, IPR835, IPR870, IPR1830, IPR1870, IPR2870, IRR267, IPR813, IRR483, IPR811, IPR436, IPR438, IPR446, IPR505, IPR524, TPR525, IPR554W, IPR584, IPR586, IPR745, IPR767, IPR1701, IPR1755, IPR740/40TP, IPR600, IPR601, IPR604, IPR605, IPR607, IPR608, IPR609, IPR600/25TO, IPR616, IPR645, IPR648, TPR860, IPR1606, IPR1608, IPR1629, IPR1940, IPR2958, IPR2959, IPR3200, IPR3201, IPR3404, IPR3411, IPR3412, IPR3415, IPR3500, IPR3502, IPR3600, IPR3603, IPR3604, TPR3605, IPR3608, IPR3700, IPR3700-20H, IPR3700-20T, IPR3700-25R, TPR3701, IPR3701-20T, IPR3703, IPR3702, RDX63182, RDX6040 and IRR419 manufactured by Daicel-UCB Co., Ltd.; CN104, CN120, CN124, CN136, CN151, CN2270, CN2271E, CN435, CN454, CN970, CN971, CN972, CN9782, CN981, CN9893 and CN991 manufactured by Sartomer Company; Laromer EA81, Laromer LR8713, Laromer LR8765, Laromer LR8986, Laromer PE56F, Laromer PE44F, Laromer LR8800, Laromer PE46T, Laromer LR8907, Laromer PO43F, Laromer PO77F, Laromer PE55S, Laromer LR8967, Laromer LR8981, Laromer LR8982, Laromer LR8992, Laromer LR9004, Laromer LR8956, Laromer LR8985, Laromer LR8987, Laromer UP35D, Laromer UA19T, Laromer LR9005, Laromer PO83F, Laromer PO33F, Laromer PO84F, Laromter PO94F, Laromer LR8863, Laromer LR8869, Laromer LR8889, Laromer LR8997, Laromer LR8996, Laromer LR9013, Laromer LR9019, Laromer PO9026V and Laromer PE9027V manufactured by BASF Co.; PHOTOMER 3005, PHOTOMER 3015, PHOTOMER 3016, PHOTOMER 3072, PHOTOMER 3982, 3215, PHOTOMER 5010, PHOTOMER 5429, PHOTOMER 5430, PHOTOMER 5432, PHOTOMER 5662, PHOTOMER 5806, PHOTOMER 5930, PHOTOMER 6008, PHOTOMER 6010, PHOTOMER 6019, PHOTOMER 6184, PHOTOMER 6210, PHOTOMER 6217, PHOTOMER 6230, PHOTOMER 6891, PHOTOMER 6892, PHOTOMER 6893-20R, PHOTOMER 6363, PHOTOMER 6572 and PHOTOMER 3660 manufactured by Cognis Co.; ART RESIN UN-9000HP, ART RESIN UN-9000PEP, ART RESIN UN-9200A, ART RESIN UN-7600, ART RESIN UN-5200, ART RESIN UN-1003, ART RESIN UN-1255, ART RESIN UN-3320HA, ART RESIN UN-3320HB, ART RESIN UN-3320HC, ART RESIN UN-3320HS, ART RESIN UN-901T, ART RESIN UN-1200TPK, ART RESIN UN-6060PTM and ART RESIN UN-6060P manufactured by Negami Chemical Industrial Co., Ltd.; SHIKOH UV-6630B, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-1400B, SHIKOH UV-1700B, SHIKOH UV-6300B, SHIKOH UV-7550B, SHIKOH UV-7605B, SHIKOH UV-7610B, SHIKOH UV-7620EA, SHIKOH UV-7630B, SHIKOH UV-7640B, SHIKOH UV-2000B, SHIKOH UV-2010B, SHIKOH UV-2250EA and SHIKOH UV-2750B manufactured by Nippon Synthetic Chemical Industry Co., Ltd.; and KAYARAD R-280, KAYARAD R-146, KAYARAD R131, KAYARAD R-205, KAYARAD EX2320, KAYARAD R190, KAYARAD R130, KAYARAD R-300, KAYARAD C-0011, KAYARAD TCR-1234, KAYARAD ZFR-1122, KAYARAD UX-2201, KAYARAD UX-2301, KAYARAD UX3204, KAYARAD UX-3301, KAYARAD UX-4101, KAYARAD UX-6101, KAYARAD UX-7101, KAYARAD MAX-5101, KAYARAD MAX-5100, KAYARAD MAX-3510 and KAYARAD UX-4101 manufactured by Nippon Kayaku Co., Ltd. An amount of the oligomer and prepolymer in the ink composition is not particularly limited, and is preferably from 5 to 50% by mass based on the entire composition.

In the present embodiment, the ink composition contains, as a photopolymerization initiator, an $\alpha$-aminoalkylphenone-based compound and a thioxanthone-based compound so as to initiate polymerization with low energy.

Specific examples of the $\alpha$-aminoalkylphenone-based compound include 2-methyl-1[4-(methylthio)phenyl]-2-morpholinopropan-1-one, 2-benzyl-2-dimethylamino-1-(4-morpholinophenyl)butanone-1 and 2-methyl-1-[4-(methoxythio)-phenyl]-2-morpholinopropan-2-one. Examples of a commercially available $\alpha$-aminoalkylphenone-based compound include Irgacure 369 and Irgacure 907 manufactured by Ciba Inc. An amount of the $\alpha$-aminoalkylphenone-based compound in the ink composition is not particularly limited, and is preferably within a range from 2 to 20% by mass based on the entire composition.

Specific examples of the thioxanthone-based compound include thioxanthone, 2-methylthioxanthone, 2-ethylthioxanthone, 2-isopropylthioxanthone, 4-isopropylthioxanthone, 2-chlorothioxanthone, 2,4-dimethylthioxanthone, 2,4-diethylthioxanthone, 2,4-dichiorothioxanthone and 1-chloro-4-propoxythioxanthone. Examples of a commercially available thioxanthone-based compound include KAYACURE DETX-S manufactured by Nippon Kayaku Co., Ltd. An amount of the thioxanthone-based compound in the ink composition is not particularly limited, and is preferably within a range from 0.1 to 10% by mass based on the entire composition. It is preferable to contain the $\alpha$-aminoalkylphenone-based compound in an amount of 40 to 99% by mass and the thioxanthone-based compound in an amount of 1 to 60% by mass, based on the entire amount of the photopolymerization initiator. It is more preferable to contain the $\alpha$-aminoalkylphenone-based compound in an amount of 40 to 91% by mass and the thioxanthone-based compound in an amount of 9 to 60% by mass, based on the entire amount of the photopolymerization initiator. When using a photopolymerization initiator containing the $\alpha$-aminoalkylphenone-based compound and the thioxanthone-based compound in the amount within the above range, an ink composition having more excellent curability and adhesion can be obtained.

The energy ray-curable ink composition may contain, in addition to the above $\alpha$-aminoalkylphenone-based compound and thioxanthone-based compound, conventionally known photopolymerization initiators such as aryl alkyl ketone, oxime ketone, acylphosphine oxide, acyl phosphonate, S-phenyl thiobenzoate, titanocene, aromatic ketone, benzyl, quinone derivative and ketocumarins. Specific examples of the photopolymerization initiator include bis(2, 4,6-trimethylbenzoyl)-phenylphosphine oxide, 1-hydroxy-cyclohexyl-phenyl-ketone, 2,2-dimethoxy-1,2-diphenylethan-1-one, 1,2-octanedion-[4-(phenylthio)-2-(o-benzoyloxime)], bis(2,6-dimethoxybenzoyl)-2,4,4-trimethyl-pentylphosphine oxide and 2,4,6-trimethylbenzoyl-phosphine oxide. An amount of the photopolymerization initiator in the ink composition is not particularly limited, and is preferably within a range from 0.5 to 10% by mass based on the entire composition.

In the present embodiment, the ink composition contains, as an antigelling agent, a hindered amine-based compound having a 2,2,6,6-tetramethylpiperidinyl group. When the above hindered amine-based compound is used, as the antigelling agent, together with a polymerizable compound having high curing sensitivity and a photopolymerization initiator, an ink composition having excellent storage stability can be obtained without deteriorating curing sensitivity of the ink composition. Specific examples of the antigelling agent include bis(1-oxyl-2,2,6,6-tetramethylpiperidin-4-yl)sebacate and decane diacid bis(2,2,6,6-tetramethyl-1-(octyloxy)-4-piperidinyl)ester. Among these antigelling agents, bis(1-oxyl-2,2,6,6-tetramethylpiperidin-4-yl)sebacate having a 1-hydroxy-2,2,6,6-tetramethylpiperidinyl group is preferable. Examples of a commercially available antigelling agent include IRGASTAB VW-10 and TINUVIN 123 manufactured by Ciba Inc.

An amount of the antigelling agent in the ink composition is not particularly limited, and is preferably within a range from 0.01 to 3% by mass, and more preferably from 0.05 to 2% by mass, based on the entire composition. When the amount of the antigelling agent is less than 0.01% by mass, a radical generated during storage cannot be sufficiently trapped and storage stability tends to deteriorate. In contrast, when the amount of the antigelling agent is more than 3% by mass, the effect of trapping a radical is saturated and also the polymerization reaction upon irradiation with energy ray tends to be inhibited.

The energy ray-curable ink composition may further contain another hindered amine-based stabilizer, and conventionally known antigelling agents such as phenol-based antioxidant, phosphorous-based antioxidant and hydroquinone monoalkyl ether. Specific examples of these antigelling agents include hydroquinone monomethyl ether, hydroquinone, t-butylcatechol, pyrogallol, and TINUVIN 111 FDL, TINUVIN 144, TINUVIN 292, TINUVIN XP40 and TINUVIN XP60 manufactured by Ciba Inc. An amount of the antigelling agent in the ink composition is not particularly limited, and is preferably within a range from 0.1 to 4% by mass based on the entire composition.

In the ink composition of the present embodiment, conventionally known various dyes may be used as a coloring material. In view of weatherability, either or both of an inorganic pigment and an organic pigment is/are preferably used.

Specific examples of the inorganic pigment include titanium oxide, zinc white, zinc oxide, Tripon, iron oxide, aluminum oxide, silicon dioxide, kaolinite, montmorillonite, talc, barium sulfate, calcium carbonate, silica, alumina, cadmium red, red iron oxide, molybdenum red, chromium vermillion, molybdate orange, lead yellow, chromium yellow, cadmium yellow, yellow oxide, titanium yellow, chromium oxide, pyridian, cobalt green, titanium cobalt green, cobalt chromium green, permanent blue, ultramarine blue, Prussian blue, cobalt blue, cerulean blue, manganese violet, cobalt violet and mica.

Specific examples of the organic pigment include azo-based, azomethine-based, polyazo-based, phthalocyanine-based, quinacridon-based, anthraquinone-based, indigo-based, thioindigo-based, quinophthalon-based, benzimidazolon-based and isoindoline-based organic pigments. Also, carbon black comprising acidic, neutral or basic carbon may be used. Furthermore, hollow particles of a crosslinked acryl resin may also be used as the organic pigment.

Specific examples of the pigment having a cyan color include C.I. Pigment Blue 1, C.I. Pigment Blue 2, C.I. Pigment Blue 3, C.I. Pigment Blue 15:3, C.I. Pigment Blue 15:4, C.I. Pigment Blue 16, C.I. Pigment Blue 22 and C.I. Pigment Blue 60. Among these pigments, either or both of C.I. Pigment Blue 15:3 and C.I. Pigment Blue 15:4 is/are preferable in view of weatherability and coloring power.

Specific examples of the pigment having a magenta color include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, C.I. Pigment Red 209, C.I. Pigment Red 254 and C.I. Pigment Violet 19. Among these pigments, at least one selected from the group consisting of C.I. Pigment Red 122, C.I. Pigment Red 202, C.I. Pigment Red 209, C.I. Pigment Red 254 and C.I. Pigment Violet 19 is preferable in view of weatherability and coloring power.

Specific examples of the pigment having a yellow color include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 120, C.I. Pigment Yellow 128, C.I. Pigment Yellow 129, C.I. Pigment Yellow 130, C.I. Pigment Yellow 138, C.I. Pigment Yellow 139, C.I. Pigment Yellow 147, C.I. Pigment Yellow 150, C.I. Pigment Yellow 151, C.I. Pigment Yellow 154, C.I. Pigment Yellow 155, C.I. Pigment Yellow 180, C.I. Pigment Yellow 185, C.I. Pigment Yellow 213 and C.I. Pigment Yellow 214. Among these pigments, at least one selected from the group consisting of C.I. Pigment Yellow 74, C.I. Pigment Yellow 83, C.I. Pigment Yellow 109, C.I. Pigment Yellow 110, C.I. Pigment Yellow 120, C.I. Pigment Yellow 128, C.I. Pigment Yellow 138, C.I. Pigment Yellow 139, C.I. Pigment Yellow 150, C.I. Pigment Yellow 151, C.I. Pigment Yellow 154, C.I. Pigment Yellow 155, C.I. Pigment Yellow 213 and C.I. Pigment Yellow 214 is preferable in view of weatherability.

Specific examples of the pigment having a black color include HCF, MCF, RCF, LFF and SCF manufactured by Mitsubishi Chemical Corporation; Monarch and Regal manufactured by Cabot Corp.; Color Black, Special Black and Printex manufactured by Degussa Huels AG; TOKA-BLACK manufactured by Tokai Carbon Co., Ltd; and Raven manufactured by Corombia Co. Among these pigments, at least one selected from the group consisting of HCF#2650, HCF#2600, HCF#2350, HCF#2300, MCF#1000, MCF#980, MCF#970, MCF#960, MCF88, LFFMA7, MA8, MA11, MA77 and MA100 manufactured by Mitsubishi Chemical Corporation; and PRINTEX 95, 85, 75, 55 and 45 manufactured by Degussa Huls AG is preferable.

An amount of a coloring material in the ink composition is not particularly limited, and is preferably within a range from 1 to 10% by mass, more preferably from 2 to 7% by mass, and most preferably from 3 to 6% by mass, based on the entire composition. When the amount of the coloring material is too small, a coloring power of images tends to decrease. In contrast, when the amount of the coloring material is too large, the viscosity of the ink composition increases and fluidity may deteriorate.

When a pigment is used as the coloring material, a pigment derivative or a pigment dispersant may be further used in combination so as to improve dispersibility of the pigment. Specific examples of the pigment derivative include a pigment derivative having a dialkylaminoalkyl group and a pigment derivative having a dialkylaminoalkylsulfonic acid amide group. As the pigment dispersant, for example, an ionic or nonionic surfactant or an anionic, cationic or nonionic polymer compound is used. Among these pigment dispersants, a polymer compound having a cationic group or an anionic group is preferable in view of dispersion stability. Examples of a commercially available pigment dispersant include SOLSPERSE manufactured by The Lubrizol Corporation, DISPER BYK manufactured by BYK-Chemie and EFKA manufactured by EFKA Additives. An amount of the pigment derivative and the pigment dispersant in the ink composition is not particularly limited and is preferably from 0.05 to 5% by mass based on the entire composition.

The ink composition of the present embodiment may optionally contain conventionally used additives such as surfactants, surface-modifiers, leveling agents, defoaming agents, antioxidants, pH regulators, charging agents, disinfectants, preservatives, deodorants, charge-adjusters, wetting agents, anti-skinning agents, UV-ray absorbers, and perfumes.

As a method for preparing an ink composition, a conventionally known preparation method can be used. When a pigment is used as the coloring material, the following preparation method is preferable.

First, a coloring material, a portion of a polymerizable compound and, if necessary, a pigment dispersant are premixed to prepare a mixed solution, and then the resulting mixed solution is dispersed by a disperser to prepare a primary dispersion. Specific examples of the disperser include disper, barrel-driving type mills such as ball mill, centrifugal mill and planetary mill, high-speed rotation mills such as sand mill, and medium-agitation mills such as agitated vessel mill.

Next, a remaining polymerizable compound, a photopolymerization initiator, an antigelling agent and, if necessary, other additives are added to the primary dispersion, followed by uniform stirring with a stirrer. Specific examples of the stirrer include a three-one motor, a magnetic stirrer, a disper or a homogenizer. Mixing may be performed using a mixer such as a line mixer. Furthermore, to reduce the particle size of particles in the ink composition, the ink composition may be mixed with a dispersing equipment such as a bead mill or a high pressure jet mill.

When a pigment is used as the coloring material, a dispersion average particle size of particles in the ink composition is preferably within a range from 20 to 200 nm, and more preferably from 50 to 160 nm. When the dispersion average particle size is less than 20 nm, the particles are too small so that weatherability of the printed material tends to deteriorate. In contrast, when the dispersion average particle size is more than 200 nm, the fineness of the printed material may deteriorate.

In the present embodiment, a viscosity at 25° C. of the ink composition is preferably within a range from 3 to 35 mPa·s, more preferably from 3 to 30 mPa·s, and most preferably from 3 to 25 mPa·s. A surface tension of an ink composition is preferably within a range from 25 to 35 mN/m, and more preferably from 30 to 35 mN/m. An ink composition having the viscosity and surface tension described above can be preferably used for printing using an ink-jet recording system.

It is not necessary that the ink composition of the present embodiment is diluted with a diluent solvent. The ink composition has a low viscosity even when it is not warmed. When the coloring material is a pigment, the ink composition has good pigment dispersibility, and also has good storage stability which prevents problems such as an increase in viscosity and sedimentation of the pigment during storage or use. Therefore, stable ejection can be obtained at room temperature without warming in an ink-jet recording system.

The ink-jet recording system is not particularly limited, and examples thereof include a charge control system in which an ink is ejected using an electrostatic force, a drop-on-demand system (pressure pulse system) in which a vibration pressure of a piezoelectric element is used, an acoustic ink-jet recording system in which a radiation pressure capable of irradiating an ink with acoustic beam converted from an electrical signal is used, and a thermal ink-jet recording system in which a pressure generated when bubbles are formed by heating an ink. Furthermore, the ink-jet recording system described above includes a system in which a large number of droplets each having a microvolume of an ink having a low concentration called a photoink are ejected, a system in which picture quality is improved using a plurality of inks each having substantially the same color tone and a different concentration, and a system in which a colorless transparent ink is used.

In the present embodiment, examples of irradiation means include ultraviolet ray irradiation means such as a mercury lamp and a metal halide lamp. In the case of the ink composition of the present embodiment, energy ray having a low energy (integrated light quantity of ultraviolet rays: 150 mJ/cm$^2$ or less) can also be used. It is preferable that the ink composition is irradiated with energy ray after 1 to 1,000 ms have passed since the ink composition was ejected on a recording medium. When an elapsed time is less than 1 ms, a distance between a head and a light source is too short so that the head may be irradiated with energy ray to cause an unforeseen situation. In contrast, when an elapsed time is more than 1,000 ms, picture quality tends to deteriorate due to ink blur when multi-color printing is used.

The present invention will now be described in detail by way of Examples. The present invention disclosed above is not limited to the following Examples. In the Examples, parts are by weight unless otherwise indicated.

EXAMPLES

Components of ink compositions used in Examples and Comparative Examples are shown in Table 1.

TABLE 1

| Components | Kinds | |
|---|---|---|
| Coloring material | Acidic carbon black pigment (MA-8) | MA-8, manufactured by Mitsubishi Chemical Corporation |
| | Nickel azo pigment (LA-2) | LA-2, manufactured by Ciba Inc. |
| | Quinacridone pigment (RT343D) | CINQUASIA Magenta RT-343-D, manufactured by Ciba Inc. |
| | Copper phthalocyanine pigment (P-BFS) | HOSTAPERM BLUE P-BFS, manufactured by Clariant |
| Pigment dispersant | Comb-shaped copolymer having a basic functional group | SOLSPERSE 32000, manufactured by The Lubrizol Corporation |
| Polymerizable compound | Isooctyl acrylate (IO-A) | SARTOMER SR440 (ethylenical double bond/one molecule: 1), manufactured by SARTOMER |
| | 1,6-hexanediol diacrylate (HDDA) | SARTOMER SR238F (ethylenical double bond/one molecule: 2), manufactured by SARTOMER |
| | Dipropylene glycol diacrylate (DPGDA) | SARTOMER SR508 (ethylenical double bond/one molecule: 1), manufactured by SARTOMER |
| | Trimethylolpropane triacrylate (TMPTA) | LIGHT-ACRYLATE TMP-A (ethylenical double bond/one molecule: 3), manufactured by KYOEISHA CHEMICAL Co., Ltd. |
| | Pentaerythritol triacrylate (PE-3A) | LIGHT-ACRYLATE PE-3A (ethylenical double bond/one molecule: 3), manufactured by KYOEISHA CHEMICAL Co., Ltd. |

TABLE 1-continued

| Components | Kinds | | |
|---|---|---|---|
| | Dipentaerythritol hexaacrylate (DPHA) | LIGHT-ACRYLATE DPH-6A (ethylenical double bond/one molecule: 6), manufactured by KYOEISHA CHEMICAL Co., Ltd. | |
| Photopolymerization initiator | 2-methyl-1-[4-(methylthio)phenyl]-2-morpholinopropan-1-one (IR. 907) | IRGACURE907 (α-aminoalkylphenone-based), manufactured by Ciba Inc. | |
| | 2-benzyl-2-diethylamino-1-(4-morpholinophenyl)-butanone (IR. 369) | IRGACURE369 (α-aminoalkylphenone-based), manufactured by Ciba Inc. | |
| | Diethylthioxantone (DETX-S) | DETX-S (thioxantone-based), manufactured by Nippon Kayaku Co., Ltd. | |
| | 2,2-dimethoxy-1,2-diphenylethan-1-one (IR. 651) | IRGACURE651 (benzylketal-based), manufactured by Ciba Inc. | |
| Antigelling agent | Bis(1-oxyl-2,2,6,6-tetramethylpiperidin-4-yl)sebacate (UV10) | IRGASTAB UV10 (hindered amine-based), manufactured by Ciba Inc. | |
| | Benzotriazole-based antigelling agent (TIN400) | TINUVIN 400 (benzotriazole-based), manufactured by Ciba Inc. | |
| | Hydroquinone monomethyl ether (HQ) | Hydroquinone monomethyl ether, manufactured by Tokyo Chemical Industry Co., Ltd. | |
| | Decane diacid bis(2,2,6,6-tetramethyl-1-(octyloxy)-4-piperidinyl)ester (TIN123) | TINUVIN 123 (hindered amine-based), manufactured by Ciba Inc. | |

<Preparation of Ink Composition>

In a 100 cc plastic bottle, a pigment, a pigment dispersant and isooctyl acrylate (IO-A) were weighed in each amount shown in Tables 2 to 4 and charged, and 100 parts of zirconia beads were added, followed by dispersion for 2 hours using a paint conditioner (manufactured by TOYO SEIKI KOGYO Co., Ltd.) to obtain a primary dispersion. To the resulting primary dispersion, remaining components were added in each amount shown in Tables 2 to 4, and then the mixture was stirred for 30 minutes using a magnetic stirrer. After stirring, the mixture was suction filtered using a glass filter (manufactured by Kiriyama Glass Works Company) to prepare an ink composition.

TABLE 2

(parts)

| | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Pigment | MA-8 | 5 | — | — | — | 5 | — | — | — | 5 | — |
| | LA-2 | — | 5 | — | — | — | 5 | — | — | — | 5 |
| | RT343D | — | — | 5 | — | — | — | 5 | — | — | — |
| | P-BFS | — | — | — | 5 | — | — | — | 5 | — | — |
| Pigment dispersant | | 2.5 | 2.5 | 2.5 | 2.5 | 2.5 | 2.5 | 2.5 | 2.5 | 2.5 | 2.5 |
| Polymerizable compound | IO-A | 12.5 | 12.5 | 12.5 | 12.5 | 12.5 | 12.5 | 12.5 | 12.5 | 12.5 | 12.5 |
| | HDDA | 20 | 20 | 20 | 20 | 19.8 | 19.8 | 19.8 | 19.8 | 20 | 20 |
| | DPGDA | 20 | 20 | 20 | 20 | — | — | — | — | 20 | 20 |
| | TMPTA | — | — | — | — | 50 | 50 | 50 | 50 | — | — |
| | PE-3A | 30 | 30 | 30 | 30 | — | — | — | — | 30 | 30 |
| | DPHA | — | — | — | — | — | — | — | — | — | — |
| Photopolymerization initiator | IR.907 | 9 | 9 | 9 | 9 | 9 | 9 | 9 | 9 | — | — |
| | IR.367 | — | — | — | — | — | — | — | — | 9 | 9 |
| | DETX-S | 0.9 | 0.9 | 0.9 | 0.9 | 1 | 1 | 1 | 1 | 0.9 | 0.9 |
| | IR.651 | — | — | — | — | — | — | — | — | — | — |
| Antigelling agent | UV10 | 0.1 | 0.1 | 0.1 | 0.1 | 0.2 | 0.2 | 0.2 | 0.2 | 0.1 | 0.1 |
| | TIN400 | — | — | — | — | — | — | — | — | — | — |
| | HQ | — | — | — | — | — | — | — | — | — | — |
| | TIN123 | — | — | — | — | — | — | — | — | — | — |
| Total | | 100 | 100 | 100 | 100 | 100 | 100 | 100 | 100 | 100 | 100 |

TABLE 3

(parts)

| | | Ex. 11 | Ex. 12 | Ex. 13 | Ex. 14 | Ex. 15 | Ex. 16 | Reference Ex. 17 | Ex. 18 |
|---|---|---|---|---|---|---|---|---|---|
| Pigment | MA-8 | — | — | 5 | 5 | 5 | 5 | 5 | 5 |
| | LA-2 | — | — | — | — | — | — | — | — |
| | RT343D | 5 | — | — | — | — | — | — | — |
| | P-BFS | — | 5 | — | — | — | — | — | — |
| Pigment dispersant | | 2.5 | 2.5 | 2.5 | 2.5 | 2.5 | 2.5 | 2.5 | 2.5 |
| Polymerizable compound | IO-A | 12.5 | 12.5 | 12.5 | 12.5 | 12.5 | 12.5 | 12.5 | 12 |
| | HDDA | 20 | 20 | 20 | 20 | 20 | 20 | 20 | 20 |
| | DPGDA | 20 | 20 | — | — | — | — | — | 20 |
| | TMPTA | — | — | 50 | 50 | 48 | 50 | 47 | — |
| | PE-3A | 30 | 30 | — | — | — | — | — | 30 |
| | DPHA | — | — | — | — | — | — | — | — |
| Photopolymerization initiator | IR.907 | — | — | 4 | 9 | 9 | 9 | 9 | 9 |
| | IR.367 | 9 | 9 | — | — | — | — | — | — |
| | DETX-S | 0.9 | 0.9 | 5.9 | 0.9 | 0.9 | 0.9 | 0.9 | 1 |
| | IR.651 | — | — | — | — | — | — | — | — |

TABLE 3-continued

| | | Ex. 11 | Ex. 12 | Ex. 13 | Ex. 14 | Ex. 15 | Ex. 16 | Reference Ex. 17 | Ex. 18 (parts) |
|---|---|---|---|---|---|---|---|---|---|
| Antigelling agent | UV10 | 0.1 | 0.1 | 0.1 | 0.1 | 2 | 0.05 | 3 | — |
| | TIN400 | — | — | — | — | — | — | — | — |
| | HQ | — | — | — | — | — | — | — | — |
| | TIN123 | — | — | — | — | — | — | — | 0.5 |
| Total | | 100 | 100 | 100 | 100 | 100 | 100 | 100 | 100 |

TABLE 4

| | | C. Ex. 1 | C. Ex. 2 | C. Ex. 3 | C. Ex. 4 | C. Ex. 5 | C. Ex. 6 | C. Ex. 7 | C. Ex. 8 | C. Ex. 9 | C. Ex. 10 (parts) |
|---|---|---|---|---|---|---|---|---|---|---|---|
| Pigment | MA-8 | 5 | 5 | 5 | 5 | 5 | — | — | — | 5 | 5 |
| | LA-2 | — | — | — | — | — | 5 | — | — | — | 5 |
| | RT343D | — | — | — | — | — | — | 5 | — | — | — |
| | P-BFS | — | — | — | — | — | — | — | 5 | — | — |
| Pigment dispersant | | 2.5 | 2.5 | 2.5 | 2.5 | 2.5 | 2.5 | 2.5 | 2.5 | 2.5 | 2.5 |
| Polymerizable compound | IO-A | 12.5 | 12.5 | 12.5 | 12.5 | 12.5 | 12.5 | 12.5 | 12.5 | 12 | 12 |
| | HDDA | — | 15 | 20 | 30 | 20 | 20 | 20 | 20 | 20 | 20 |
| | DPGDA | 70 | 20 | 20 | 30 | 20 | 20 | 20 | 20 | 20 | 20 |
| | TMPTA | — | — | — | — | — | — | — | — | — | — |
| | PE-3A | — | 30 | 30 | — | 30 | 30 | 30 | 30 | 30 | 30 |
| | DPHA | — | — | — | 10 | — | — | — | — | — | — |
| Photopolymerization initiator | IR.907 | 9 | — | 9.9 | — | 9 | 9 | 9 | 9 | 9 | 9 |
| | IR.367 | — | — | — | — | — | — | — | — | — | — |
| | DETX-S | 0.9 | — | — | 0.9 | 1 | 1 | 1 | 1 | 1 | 1 |
| | IR.651 | — | 14.9 | — | 9 | — | — | — | — | — | — |
| Antigelling agent | UV10 | 0.1 | 0.1 | 0.1 | 0.1 | — | — | — | — | — | — |
| | TIN400 | — | — | — | — | — | — | — | — | 0.5 | — |
| | HQ | — | — | — | — | — | — | — | — | — | 0.5 |
| | TIN123 | — | — | — | — | — | — | — | — | — | — |
| Total | | 100 | 100 | 100 | 100 | 100 | 100 | 100 | 100 | 100 | 100 |

<Evaluation>

With respect to the ink compositions thus prepared of Examples and Comparative Examples, the following viscosity, dispersion average particle size and surface tension were measured. The results are shown in Table 5.

<Viscosity>

A viscosity of an ink composition was measured using a R100 viscometer (manufactured by TOKI SANGYO Co., Ltd.) at 25° C. and a cone rotation speed of 20 rpm.

<Dispersion Average Particle Size>

A dispersion average particle size of pigment particles was measured using a particle size analyzer N4-PLUS (a laser Doppler particle size analyzer manufactured by Coulter).

<Surface Tension>

A surface tension of an ink composition was measured using a full-automatic balance type electrotensiometer ESB-V (manufactured by KYOWA SCIENCE Co., Ltd.) at an ink temperature of 25° C.

TABLE 5

| Ex. No. | Viscosity (mPa·s) | Dispersion average particle size (nm) | Surface tension (mN/m) |
|---|---|---|---|
| 1 | 28.0 | 90.0 | 34.5 |
| 2 | 27.5 | 140.0 | 34.5 |
| 3 | 28.5 | 125.0 | 34.8 |
| 4 | 28.0 | 120.0 | 34.6 |
| 5 | 23.0 | 90.0 | 34.5 |
| 6 | 22.5 | 140.0 | 34.5 |
| 7 | 23.5 | 125.0 | 34.8 |
| 8 | 23.0 | 120.0 | 34.6 |
| 9 | 28.0 | 90.0 | 34.5 |
| 10 | 27.5 | 140.0 | 34.5 |
| 11 | 28.5 | 125.0 | 34.8 |
| 12 | 28.0 | 120.0 | 34.6 |
| 13 | 24.0 | 90.0 | 34.5 |
| 14 | 23.8 | 90.0 | 34.6 |
| 15 | 23.9 | 90.0 | 34.5 |
| 16 | 23.5 | 90.0 | 34.5 |
| Reference Ex. 17 | 21.5 | 90.0 | 34.8 |
| 18 | 28.0 | 90.0 | 34.8 |
| C. 1 | 16.0 | 90.0 | 35.1 |
| C. 2 | 32.0 | 90.0 | 34.8 |
| C. 3 | 29.5 | 90.0 | 35.0 |
| C. 4 | 20.0 | 90.0 | 34.5 |
| C. 5 | 28.0 | 90.0 | 34.5 |
| C. 6 | 27.5 | 140.0 | 34.5 |
| C. 7 | 28.5 | 125.0 | 34.8 |
| C. 8 | 28.0 | 120.0 | 34.6 |
| C. 9 | 28.0 | 90.0 | 34.8 |
| C. 10 | 28.1 | 90.0 | 34.7 |

As shown in the above table, it was confirmed that ink compositions of Examples have a viscosity within a range from 21.5 to 28.5 mPa·s and a surface tension within a range from 34.5 to 34.8 mN/m, and also have a low viscosity and a surface tension suited for an ink-jet recording system.

With respect to ink compositions of Examples and Comparative Examples, the following continuous ejection properties, curability and adhesion were evaluated. The results are shown in Table 6.

<Continuous Ejection Properties>

Using an ink-jet recording device equipped with a piezo type ink-jet nozzle, an ink was continuously ejected for 30 minutes and an ejection state was observed, and then continuous ejection properties were evaluated according to the following criteria. This ink-jet recording device is equipped with an ink tank, a feed pipe, a vestibule ink tank arranged right before a piezo head, and the piezo head as an ink feed system. A droplet size was about 7 pl, and an ink-jet recording device was driven at a drive frequency of 10 kHz so that an ink can be ejected at a resolution of 600×600 dpi.

A: Any poor discharge does not occur within 30 minutes continuous ejection.

B: Nozzle missing does not occur, but satellite occurs within 30 minutes continuous ejection.

C: Nozzle missing occurs within 30 minutes continuous ejection.

<Curability>

On a film made of polyethylene terephthalate (PET), an ink composition was print coated using a bar coater to form printed films each having a thickness of 2 μm (bar coater: #3) or 15 μm (bar coater: #12). Each printed film was irradiated with ultraviolet rays using a metal halide lamp as irradiation means (integrated light quantity: 100 mJ/cm$^2$) thereby curing the printed film.

The surface of the printed material was touched with a finger and a nail, and it was visually observed whether or not an ink adheres to the finger and nail, and then curability was evaluated according to the following criteria.

A: The ink does not adhere to the finger and nail, and the surface of the printed material is not scratched even when rubbed with the nail.

B: The ink does not adhere to the finger, but the surface of the printed material is scratched when rubbed with the nail.

C: The ink adheres to the finger.

<Adhesion>

On a film made of polyvinyl chloride (PVC) and a film made of polyethylene terephthalate (PET), an ink composition was print coated using a bar coater to form printed films each having a thickness of 2 μm (bar coater: #3) or 15 μm (bar coater: #12). Each printed film was irradiated with ultraviolet rays using a metal halide lamp as irradiation means (integrated light quantity: 150 mJ/cm$^2$) thereby curing the printed film.

A cross cut-tape test (1 mm square, 100 test samples) of confirming a peeled state of the cured printed material thus according to JIS-K-5400 using SELLOTAPE® was carried out. The number of peeled test samples among 100 test samples was examined and then adhesion was evaluated according to the following criteria.

A: The number of peeled test samples is 10 or less in the cross cut-tape test.

B: The number of peeled test samples is 20 or less in the cross cut-tape test.

C: The number of peeled test samples is 21 or more in the cross cut-tape test.

TABLE 6

| Ex. No. | Continuous ejection properties | Curability 2 μm (thin film) | Curability 15 μm (thick film) | Adhesion PVC 2 μm (thin film) | Adhesion PVC 15 μm (thick film) | Adhesion PET 2 μm (thin film) | Adhesion PET 15 μm (thick film) |
|---|---|---|---|---|---|---|---|
| 1 | A | A | A | A | A | A | A |
| 2 | A | A | A | A | A | A | A |
| 3 | A | A | A | A | A | A | A |
| 4 | A | A | A | A | A | A | A |
| 5 | A | A | A | A | A | A | A |
| 6 | A | A | A | A | A | A | A |
| 7 | A | A | A | A | A | A | A |
| 8 | A | A | A | A | A | A | A |
| 9 | A | A | A | B | A | A | A | B |
| 10 | A | A | A | A | A | A | A |
| 11 | A | A | B | A | A | A | A |
| 12 | A | A | A | A | A | A | B |
| 13 | A | A | A | A | A | A | A |
| 14 | A | A | A | A | A | A | A |
| 15 | A | A | A | A | B | A | A |
| 16 | A | A | A | A | A | A | A |
| Reference Ex. 17 | A | B | B | B | B | B | C |
| 18 | A | A | A | A | A | A | A |
| C. 1 | A | B | C | B | B | C | C |
| C. 2 | A | A | C | B | C | C | C |
| C. 3 | A | A | C | A | C | B | C |
| C. 4 | A | A | C | A | C | C | C |
| C. 5 | A | A | A | A | A | A | A |
| C. 6 | A | A | A | A | A | A | A |
| C. 7 | A | A | A | A | A | A | A |
| C. 8 | A | A | A | A | A | A | A |
| C. 9 | A | A | A | A | A | A | A |
| C. 10 | A | A | A | A | A | A | A |

As is apparent from the results in the above table, ink compositions of Examples are excellent in continuous ejection properties and are also excellent in curability and adhesion in both cases of a thin film (2 μm) and a thick film (15 μm). This fact shows that ink compositions of Examples contain a polyfunctional monomer having three or more ethylenical double bonds in one molecule as a polymerizable compound, and contain an α-aminoalkylphenone-based compound and a thioxanthone-based compound as photopolymerization initiators, and also contain the α-aminoalkylphenone-based compound in an amount of 40 to 91% by mass and the thioxanthone-based compound in an amount of 9 to 60% by mass based on the entire amount of the photopolymerization initiator, and are therefore excellent in curing sensitivity, and sufficient curability and adhesion can be obtained even when irradiated with energy ray having low energy. It is also apparent that ink compositions containing a large amount of a hindered amine-based compound having a 2,2,6,6-tetramethylpiperidinyl group as an antigelling agent have curability and adhesion similar to those of ink compositions containing a conventional antigelling agent of Comparative Examples, and thus curability and adhesion are not adversely affected even when ink compositions contain the above hindered amine-based compound.

In contrast, it is apparent that an ink composition containing no polyfunctional monomer having three or more ethylenical double bonds in one molecule as a polymerizable compound of Comparative Example 1 and ink compositions containing either or both of an α-aminoalkylphenone-based compound and a thioxanthone-based compound as photopolymerization initiators of Comparative Examples 2 to 4 are inferior in curability and adhesion.

With respect to ink compositions of Examples and Comparative Examples, the following storage stability was evaluated. The results are shown in Table 7.

<Storage Stability>

An ink composition was filled in a brown glass bottle I (a cavity portion is filled with air), a brown glass bottle II (a cavity portion is filled with nitrogen) and an aluminum pouch whose inside is coated with polyethylene, respectively.

Each container was stored under storage conditions A (at 60° C. for 30 days) and storage conditions B (at 70° C. for 14 days) and a change in viscosity and the occurrence of gelation of the ink composition were observed, and then storage stability was evaluated according to the following criteria.
A: The change in viscosity is less than 10%.
B: The change in viscosity is 10 or more and less than 20%.
C: The change in viscosity is 20% or more.
D: Gelation occurs in the container and the ink is converted into a solid state.

TABLE 7

| | Storage Stability | | | | | |
|---|---|---|---|---|---|---|
| | Brown glass bottle I | | Brown glass bottle II | | Aluminum pouch | |
| Ex. No. | Storage conditions A | Storage conditions B | Storage conditions A | Storage conditions B | Storage conditions A | Storage conditions B |
| 1 | A | A | A | A | A | A |
| 2 | A | A | A | A | A | A |
| 3 | A | A | A | A | A | A |
| 4 | A | A | A | A | A | A |
| 5 | A | A | A | A | A | A |
| 6 | A | A | A | A | A | A |
| 7 | A | A | A | A | A | A |
| 8 | A | A | A | A | A | A |
| 9 | A | A | A | A | A | A |
| 10 | A | A | A | A | A | A |
| 11 | A | A | A | A | A | A |
| 12 | A | A | A | A | A | A |
| 13 | A | A | A | A | A | A |
| 14 | A | A | A | A | A | A |
| 15 | A | A | A | A | A | A |
| 16 | A | A | A | B | B | C |
| Reference Ex. 17 | A | A | A | A | A | A |
| 18 | A | A | B | C | B | C |
| C. 1 | A | A | A | A | A | A |
| C. 2 | A | A | A | A | A | A |
| C. 3 | A | A | A | A | A | A |
| C. 4 | A | A | A | A | A | A |
| C. 5 | A | C | C | D | D | D |
| C. 6 | A | C | C | D | D | D |
| C. 7 | A | C | C | D | D | D |
| C. 8 | A | C | C | D | D | D |
| C. 9 | A | A | B | C | B | C |
| C. 10 | B | B | B | C | B | C |

As shown in the above table, it is apparent that ink compositions containing a hindered amine-based compound having a 2,2,6,6-tetramethylpiperidinyl group as an antigelling agent of Examples hardly cause a change in viscosity even when stored at high temperature and are therefore excellent in storage stability. It is also apparent that ink compositions containing a small amount of the hindered amine-based compound of Examples tend to cause deterioration of storage stability when stored at high temperature, but have improved storage stability when compared with ink compositions containing a conventional antigelling agent of Comparative Examples. It is also apparent that ink compositions containing bis(1-oxyl-2,2,6,6-tetramethylpiperidin-4-yl)sebacate having a 1-hydroxy-2,2,6,6-tetramethylpiperidinyl group of Examples 1 to 16 and Reference Example 17 are excellent in storage stability when compared with an ink composition containing a hindered amine-based compound having an alkoxy substituent of Example 18.

In contrast, ink compositions containing no antigelling agent of Comparative Examples were inferior in storage stability since viscosity of ink compositions drastically increased after storage and ink compositions were converted into a solid state when stored at high temperature. Ink compositions containing a benzotriazole-based compound and a hydroquinone-based compound as antigelling agents of Comparative Examples 9 and 10 have improved storage stability when compared with ink compositions containing no antigelling agent. However, viscosity increased after storage and thus ink compositions are not suited for use in an ink-jet recording system.

While the ink composition of the present embodiment was described in detail, preferable ink composition of the present embodiment is summarized as follows.

(1) By using a polyfunctional monomer having three or more ethylenical double bonds in one molecule as a polymerizable compound, an α-aminoalkylphenone-based compound and a thioxanthone-based compound as photopolymerization initiators, and a hindered amine-based compound having a 2,2,6,6-tetramethylpiperidinyl group as an antigelling agent, an ink composition, which is excellent in curability and adhesion, and is also excellent in storage stability, can be obtained even when irradiated with energy ray having low energy.

(2) As the antigelling agent, a 1-hydroxy-hindered amine-based compound having a 2,2,6,6-tetramethylpiperidinyl group is preferable, and bis(1-oxyl-2,2,6,6-tetramethylpiperidin-4-yl)sebacate is particularly preferable.

(3) It is preferable that the ink composition contains a polyfunctional monomer in an amount of 10 to 65% by mass, an α-aminoalkylphenone-based compound in an amount of 2 to 20% by mass, a thioxanthone-based compound in an amount of 0.1 to 10% by mass and a hindered amine-based compound in an amount of 0.01 to 3% by mass, based on the entire amount of the ink composition.

(4) It is preferable that the ink composition contains an α-aminoalkylphenone-based compound in an amount of 40 to 99% by mass and a thioxanthone-based compound in an amount of 1 to 60% by mass, based on the entire amount of the photopolymerization initiator.

(5) Particularly preferable is an energy ray-curable ink composition comprising a coloring material; at least one of a polyfunctional monomer selected from the group consisting of trimethylolpropane tri(meth)acrylate and pentaerythritol tri(meth)acrylate as a polymerizable compound; at least one of an α-aminoalkylphenone-based compound selected from the group consisting of 2-methyl-1-[4-(methylthio)phenyl]-2-morpholinopropan-1-one and 2-benzyl-2-dimethylamino-1-(4-morpholinophenyl)-butanone, and a thioxanthone-based compound as photopolymerization initiators; and bis(1-oxyl-2,2,6,6-tetramethylpiperidin-4-yl)sebacate as an antigelling agent;
wherein
the energy ray-curable ink composition contains the polyfunctional monomer in an amount of 10 to 65% by mass, the α-aminoalkylphenone-based compound in an amount of 2 to 20% by mass, the thioxanthone-based compound in an amount of 0.1 to 10% by mass and the bis(1-oxyl-2,2,6,6-tetramethylpiperidin-4-yl)sebacate in an amount of 0.01 to 3% by mass, based on the entire amount of the ink composition; and
also contains the (Y-aminoalkylphenone-based compound in an amount of 40 to 99% by mass and the thioxanthone-based compound in an amount of 1 to 60% by mass, based on the entire amount of the photopolymerization initiator.

What is claimed is:

1. An energy ray-curable ink composition comprising a coloring material; a polyfunctional monomer having three or more ethylenical double bonds in one molecule and a polymerizable monomer having one or two ethylenical double bonds in one molecule as polymerizable compounds, said polymerizable compounds consisting of (meth)acrylate monomers; an α-aminoalkylphenone-based compound and a thioxanthone-based compound as photopolymerization initiators; and a hindered amine-based compound having a 2,2,6,6-tetramethylpiperidinyl group as an antigelling agent, wherein said energy ray-curable ink composition contains the polyfunctional monomer in an amount of 10 to 65% by mass, the polymerizable monomer having one or two ethylenical double bonds in one molecule in an amount of 10 to 70% by mass, the α-aminoalkylphenone-based compound in an amount of 2 to 20% by mass, the thioxanthone-based compound in an amount of 0.1 to 10% by mass and the hindered amine-based compound in an amount of 0.01 to 2% by mass, based on the entire amount of the ink composition, and wherein said energy ray-curable ink composition contains the α-aminoalkylphenone-based compound in an amount of 40 to 99% by mass and the thioxanthone-based compound in an amount of 1 to 60% by mass, based on the entire amount of the photopolymerization initiator;

wherein the thioxanthone-based compound is selected from the group consisting of thioxanthone, 2-methylthioxanthone, 2-ethylthioxanthone, 2-isopropylthioxanthone, 4-isopropylthioxanthone, 2-chlorothioxanthone, 2,4-dimethylthioxanthone, 2,4-diethylthioxanthone, 2,4-dichlorothioxanthone, and 1-chloro-4-propoxythioxanthone.

2. The energy ray-curable ink composition according to claim 1, wherein the hindered amine-based compound has a 1-hydroxy-2,2,6,6-tetramethylpiperidinyl group.

3. The energy ray-curable ink composition according to claim 1, which contains, as the hindered amine-based compound, bis(1-oxyl-2,2,6,6-tetramethylpiperidin-4-yl)sebacate.

4. An energy ray-curable ink composition comprising a coloring material; at least one of a polyfunctional monomer selected from the group consisting of trimethylolpropane tri (meth)acrylate and pentaerythritol tri(meth)acrylate as a polymerizable compound; at least one of an α-aminoalkylphenone-based compound selected from the group consisting of 2-methyl-1-[4-(methylthio)phenyl]-2-morpholinopropan-1-one and 2-benzyl-2-dimethylamino-1-(4-morpholinophenyl)-butanone, and a thioxanthone-based compound as photopolymerization initiators; and bis(1-oxyl-2,2,6,6-tetramethylpiperidin-4-yl)sebacate as an antigelling agent; wherein the energy ray-curable ink composition contains the polyfunctional monomer in an amount of 10 to 65% by mass, the α-aminoalkylphenone-based compound in an amount of 2 to 20% by mass, the thioxanthone-based compound in an amount of 0.1 to 10% by mass and the bis(1-oxyl-2,2,6,6-tetramethylpiperidin-4-yl)sebacate in an amount of 0.01 to 2% by mass, based on the entire amount of the ink composition; and also contains the α-aminoalkylphenone-based compound in an amount of 40 to 99% by mass and the thioxanthone-based compound in an amount of 1 to 60% by mass, based on the entire amount of the photopolymerization initiator;

wherein the thioxanthone-based compound is selected from the group consisting of thioxanthone, 2-methylthioxanthone, 2-ethylthioxanthone, 2-isopropylthioxanthone, 4-isopropylthioxanthone, 2-chlorothioxanthone, 2,4-dimethylthioxanthone, 2,4-diethylthioxanthone, 2,4-dichlorothioxanthone, and 1-chloro-4-propoxythioxanthone.

* * * * *